Figure 1:
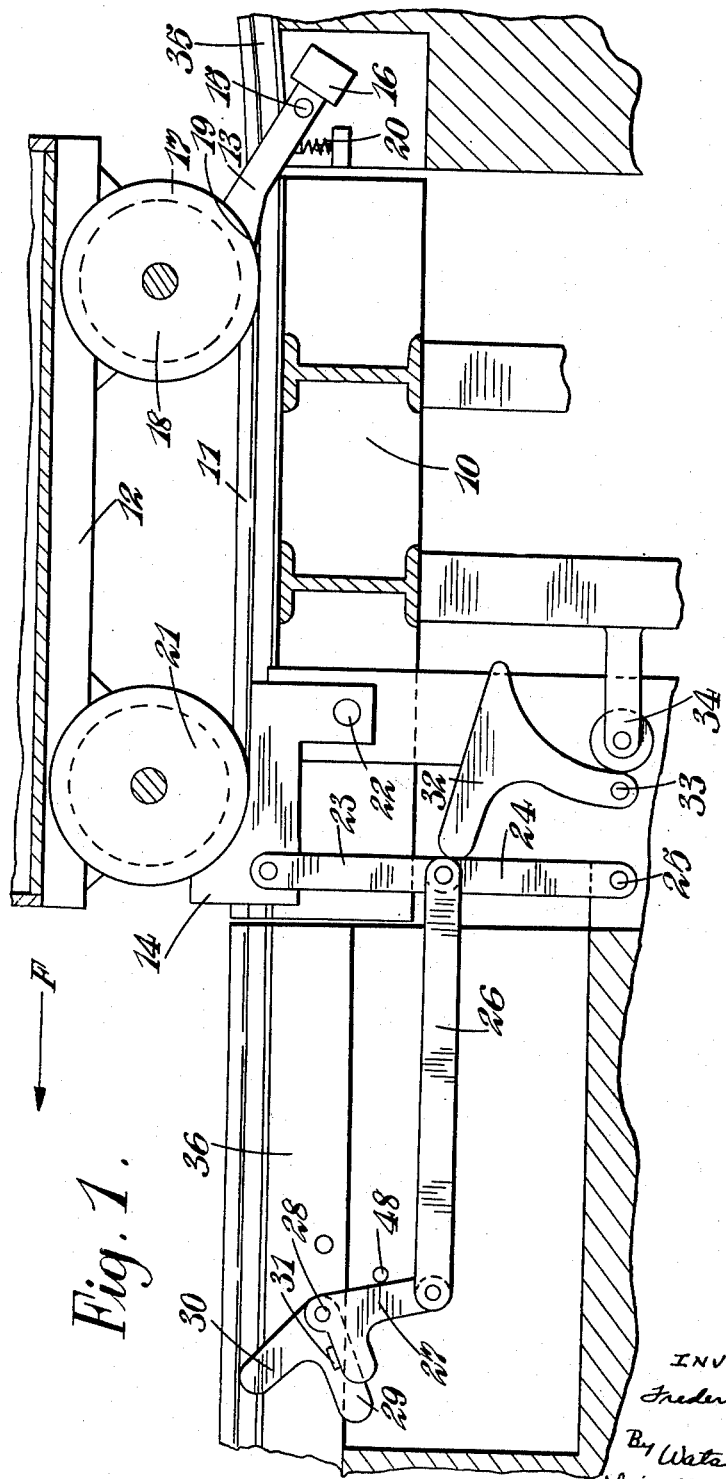

Dec. 2, 1952     F. G. MITCHELL     2,620,077
VEHICLE CHOCKING MECHANISM FOR TIPPLERS
Filed May 23, 1949     3 Sheets-Sheet 1

INVENTOR
Frederick G. Mitchell
By Watson, Cole
Grindle & Watson

INVENTOR
Frederick G. Mitchell
By Watson, Cole, Grindle
 + Watson

Dec. 2, 1952  F. G. MITCHELL  2,620,077
VEHICLE CHOCKING MECHANISM FOR TIPPLERS
Filed May 23, 1949  3 Sheets-Sheet 3
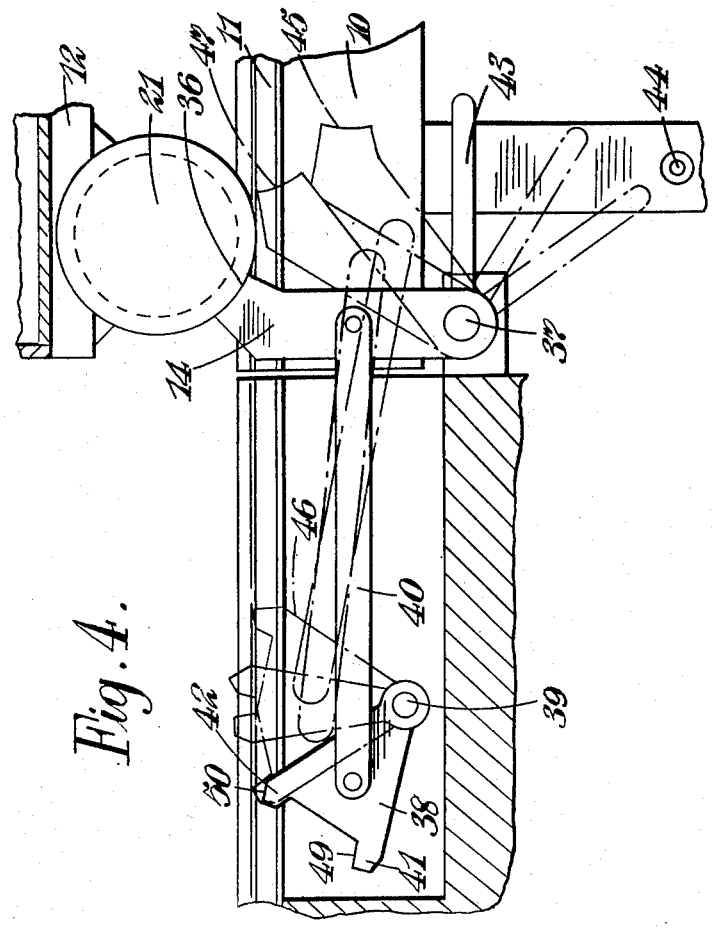
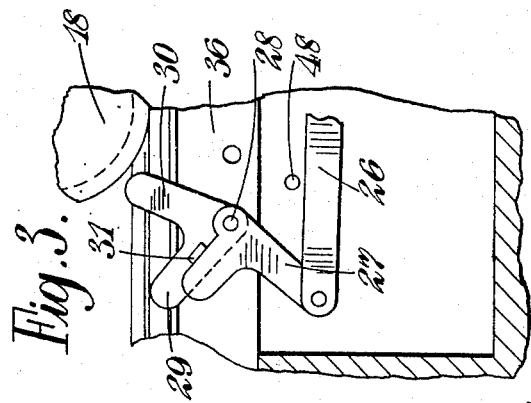
INVENTOR
Frederick G. Mitchell
By Watson, Cole, Grindle & Watson Patented Dec. 2, 1952

2,620,077

UNITED STATES PATENT OFFICE 2,620,077

VEHICLE CHOCKING MECHANISM FOR TIPPLERS

Frederick Gilbert Mitchell, London, England

Application May 23, 1949, Serial No. 94,888
In Great Britain March 4, 1948

4 Claims. (Cl. 214—55)

This invention relates to wagon-tipplers and similar vehicle handling apparatus of the type having a movable platform, which may be in the form of a cradle, to receive each of a succession of vehicles in turn and to support the vehicle during a load discharging or other handling operation.

Wagons are usually fed under the action of gravity on to such tipplers, and it is frequently necessary for the operator to stop them by hand, which is often quite difficult and sometimes a dangerous operation; it always takes a little time, and it is possible for the wagons to go too far and be difficult to return. The present invention has for its main object to obviate these drawbacks, and to control the position of each successive vehicle on the platform of a tippler or similar vehicle handling apparatus in an improved manner.

According to the present invention a tippler or similar apparatus of the type described has a movable abutment normally positioned to cooperate with a part of each vehicle at the front thereof to act as a stop to arrest the vehicle at a predetermined position on the platform, means for moving the abutment out of its normal stop position to permit the passage of the vehicle off the platform, and means controlled automatically by the off going vehicle to reset the abutment in its stop position. Preferably the means for moving the abutment out of its normal stop position is arranged to be controlled automatically by movement of the platform in its handling of the vehicle.

The apparatus conveniently includes a withdrawable front stop to prevent each vehicle from running rearwardly off the platform, which stop is arranged to withdraw automatically from the path of each vehicle as it advances on to the platform and to return to its operative position when the vehicle has overrun it. In practice the front stop for preventing the wagons running rearwardly and the abutment for arresting the wagons would be spaced apart, horizontally of the platform, by a distance sufficient to enable the longest wagon to be handled by the tippler to be accommodated between them. The movable platform of the apparatus may be provided with parallel running rails to support wagons having flanged wheels to run on and be guided by said rails, and the abutment may take the form of chocks associated with the rails to engage the wheels of the wagons.

Preferably the means controlled by the off going vehicle to reset the abutment in its stop position comprises a double arm lever operatively connected to the abutment and pivoted to a support upon the fixed structure of the tippler or the like and located at a position spaced away from the abutment in the direction of travel of the vehicles, and the two arms of the lever are so arranged as to be rocked over in succession by the front and rear wheels respectively of each vehicle to return the abutment to its stop position when the rear wheel engages the second arm.

Figure 2:
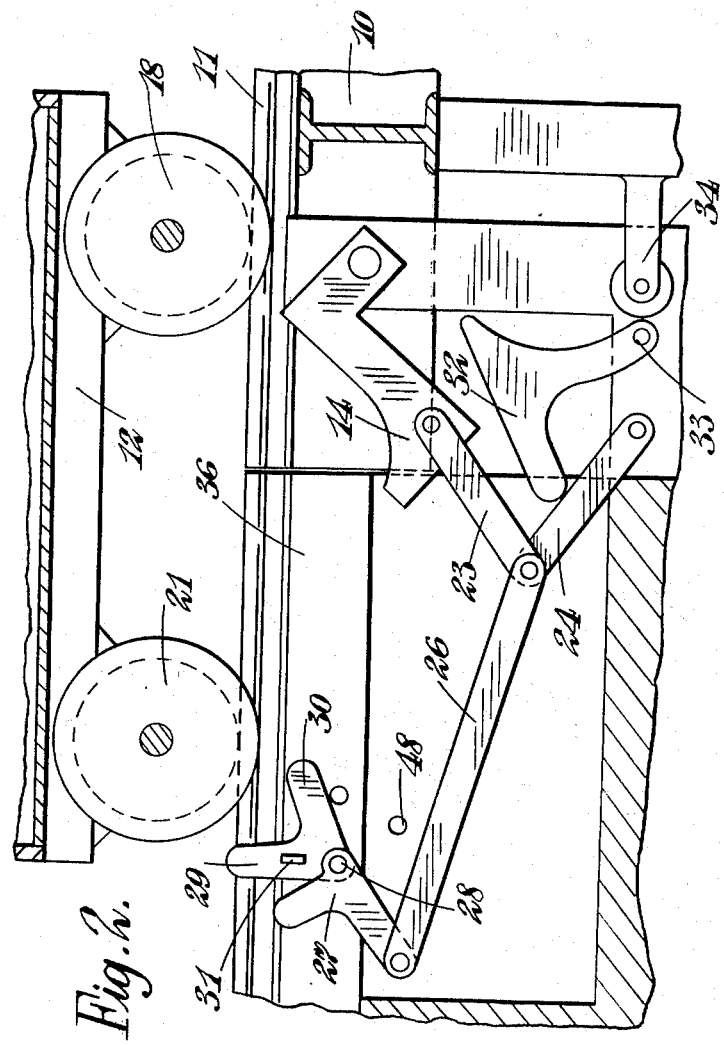

Various embodiments of the invention will now be described by way of example, and with reference to the accompanying drawings in which:

Figure 1 is a diagrammatic elevation of a tippler platform and associated structure incorporating the invention, Figure 2 is an elevation showing part of the apparatus of Figure 1 with the operating linkage for the abutment in a different position, Figure 3 is a further elevation of the parts of Figure 2 showing a further position of the operating linkage, Figure 4 is a diagrammatic elevation showing an alternative arrangement of links and levers for operating the abutment.

Referring firstly to Figure 1, the movable cradle 10 of a rotary tippler is provided with running rails for supporting flanged wheels of a vehicle 12, hereinafter referred to as a wagon, during handling of the wagon by the tippler. In this rotary tippler the cradle 10 is rotatable bodily about an axis parallel to the running rails, so that when a wagon on the tippler is to be emptied the cradle 10 and the wagon are lifted bodily in an arcuate path about the axis of rotation until the wagon has been inverted or partly inverted. Then the platform and wagon are returned in the same path to the original position. Front and rear movable stops 13, 14, hereinafter referred to as chocks, are arranged spaced apart longitudinally of the cradle, one at or near each end of a running rail 11 on the cradle, far enough apart to permit the front and rear wheels of the longest wagon to be handled by the tippler to lie between them. The wagons, during their passage on to and off the cradle 10 for the purpose of being handled by the tippler, move in the direction of the arrow F, that is from right to left of Figure 1. The front chock 13, that is the chock at the incoming end of the rail, is pivotally mounted on the fixed structure of the tippler at a point 15 situated at a level below the adjacent end of the rail 11 and forwardly, that is to the right, thereof, so that it can rock from an upwardly slanting operative position in which it lies in the path of the wagon wheels, to a lower inoperative position. The chock is provided with a counterbalance weight 16 to urge it into its operative position, and when a wagon runs on to the cradle the chock 13 is depressed into its inoperative position against the action of the counterbalance weight by the front and rear wheels of the wagon in turn to allow them to pass over it. As soon as the wheels have passed the chock 13 returns to its operative position under the action of the counterbalance weight 16, and if the wagon shows any tendency to run back, the periphery of the flange 17 of the rear wheel 18 engages the curved surface 19 of the chock 13 and the wagon is arrested. The wheel does not depress the chock into its inoperative position owing to the steepness of the face 19 of the chock, that is the large angle which the face 19 makes with the horizontal, particularly at the upper part of said face 19. The chock is prevented from swinging too far in an upward direction by a spring stop 20. The control member for the front chock 13 is shown in the present embodiments as a counterbalance weight, but it will readily be seen that alternative means such as a spring, or a dashpot device, could equally well be used.

The rear chock 14 at the outgoing or left hand end of the rail 11 has an inwardly-curved or arcuate surface which substantially fits the periphery of the flange of the front wheel 21 of the wagon which is to bear against it. The forward end of the chock 14 is pivoted at 22 to the fixed structure of the tippler so that it may rock between an upper operative position and a lower inoperative position about its pivot as in the case of the front chock 13. The rearward end of the chock 14 is pivoted to the upper link 23 of a pair of "vertical" toggle links 23, 24, which when extended, support the chock 14 in its operative position, but may be folded to allow the chock to drop into its inoperative position; the lower end of the lower toggle link 24 is pivoted at 25 to the tippler structure or to the foundation thereof. The middle pivot of this toggle device is connected to one end of a longer link 26 which extends from the toggle links in the direction of travel of the wagons and has its other end pivoted to a short link 27 hinged upon the tippler structure at 28. A bell crank lever having two arms 29—30 set substantially at right angles to one another is pivoted to rock about the axis 28 independtly of the link 27. The arm 29 of the bell crank lever is provided with a laterally projecting lug 31 to engage with the link 27 as the bell crank lever rocks and resets the chock 14 in its operative position as will hereinafter be described.

Means for breaking the toggle device to produce folding of the toggle links 23, 24 and thereby lower the chock 14 into its inoperative position is provided which consists of a hammer headed member 32 pivoted at 33 upon the fixed structure of the tippler and arranged to be thrown over by an actuating member 34 secured to the movable cradle 10 of the tippler. The members 32 and 34 are so arranged that as the cradle 10 is raised the member 34 throws over the hammer headed member 32 and causes it to press upon the links 23, 24 of the toggle device at or near their central pivotal connection so breaking the toggle.

As a wagon enters the tippler from the right hand end thereof, the front chock 13 will be depressed twice as the front and rear wheels of the wagon pass over it, and will spring up under the action of its counterweight to prevent them running in the rearward direction. The spacing of the chocks 13 and 14 is such as to prevent a wagon with the longest wheel base used from leaving the rails upon the cradle in either direction. As the wagon runs on to the cradle the rear chock 14 is in its upper or operative position supported by the extended toggle links 23, 24, and the wagon is, therefore, brought to a halt by the chock 14 engaging the flange of its front wheel 21. When the cradle 10, with the wagon upon it, lifts, and is moved in the aforesaid arcuate path about its axis of rotation to turn the wagon over for the purpose of disembarking its contents, member 32 is caused to break the toggle supporting chock 14 by the actuating member 34 upon the cradle and the rear chock is lowered into its inoperative position, so that when the cradle is returned to its location between the approach and reception ramps 35, 36 of the tippler, the wagon can pass off it on to the fixed track in the forward direction without any interference from the rear chock.

Figure 2 shows the positions of the various links and levers associated with the rear chock as the wagon is about to leave the cradle. When the front wheel 21 of the wagon arrives at the bell crank lever pivoted on the axis 28 it engages the upwardly directed arm 29 of the bell crank lever and rocks it over, depressing it below the level of the wheel flange and bringing the second arm 30 of the bell crank lever into an upwardly directed position as shown in Figure 3. In this position the lug 31 on the arm 29 of the bell crank lever comes into engagement with the link 27. As the wagon continues to run off the cradle 10 on to the reception ramp 36, the rear wheel 18 of the wagon engages the arm 30 of the bell crank lever and rocks it over in its turn, which action causes the lug on the arm 29 to co-act with the link 27 and forces the long link 26 rearwardly whereby the toggle links 23, 24 are extended and the rear chock 14 is reset in its operative position, at the same time throwing back the hammer headed member 32 in readines for re-engagement by the actuating member 34 on the cradle. When the resetting of the rear chock has been completed the bell crank lever is in the position shown in Figure 1.

In this way the rear chock 14 is replaced into its operative position immediately after the second wheel of the wagon has passed the bell crank lever, so that it is ready to stop the next full incoming wagon. A stop 48 is provided upon the tippler structure to prevent the linkage from moving too far to the right of Figure 1 during the resetting operation, and to prevent the toggle links from folding toward the right when they are supporting the chock 14 in its operative position. The described cycle of operations is repeated when a second loaded wagon comes on to the cradle.

Referring now to Figure 4, this figure illustrates an alternative method for the automatic control of the rear chock 14. In this embodiment, as can be seen from the drawing the rear chock 14 is of somewhat different shape to that of the first embodiment, being arranged more or less in a vertical manner having at its upper end an arcuate face 36 to engage the flange periphery of the front wheel 21 of the wagon and being pivoted at its lower end to rock about a pivot 37 on the fixed structure of the tippler or a foundation thereof. The control mechanism for returning the chock to its operative position after it has been lowered comprises a control lever 38 of angular or forked construction that is pivoted by means of a stiff joint 39 upon the tippler structure or foundation thereof spaced away from the rear chock 14 in the direction of travel of the wagons and a long link 40 pivotally connecting said control lever 38 with the rear chock. The control lever 38 is provided with two limbs 41, 42, arranged to be rocked over in turn by the front and rear wheels respectively of the wagon as it leaves the tippler cradle. The upper ends or prongs of the limbs of the control lever have faces 49, 50 inclined forwardly, that is in the direction of travel of the wagons, to facilitate engagement and depression of the limbs by the wagon wheels. When the rear chock 14 is rocked into its inoperative position the rear limb 42 of the control lever 38 lies below the level of the path of the wheels and the front limb 41 extends into said path ready to be rocked by the front wheel of an empty wagon as it leaves the cradle and so places the rear limb into a position extending into the path of the wheel flanges ready to be rocked over by the rear wheel of the wagon and thereby reset the rear chock in its operative position.

A spring bar 43 is hinged at one end upon the pivotal axis 37 of the chock 14 and is arranged to extend horizontally when the chock is in its operative position, into the path of an actuating bar 44 secured to the movable cradle of the tippler. The bar 43 is connected to the chock 14 by a lost motion connection which allows the bar to move freely in an upward direction irrespective of the chock against the action of a return spring (not shown). When moved downwardly, however, the bar 43 is rigid with the chock 14 and therefore such downward movement of the bar causes the chock to take up its inoperative position as shown in dotted lines at 45.

As before, a wagon runs on to the cradle, depressing a front stop of the type shown in Figure 1 which springs up to prevent rearward movement when the wagon has passed, and the wagon is arrested by the rear chock 14 which is then in its operative position; the cradle then lifts with the wagon, upon it, for example, for the purpose of emptying the wagon, and as it does so the bar 44 thereof engages with the bar 43 connected to the rear chock, which bar moves upwardly to allow the bar 44 on the cradle to pass it and thereafter springs back into its horizontally extending position. When the cradle returns to its position between the approach and reception ramps, as the cradle descends the bar 44 thereon again engages the bar 43 and forces it downwardly thereby lowering the chock 14 into its inoperative position as shown in dotted lines at 45. The wagon is now free to run forwardly off the cradle without interference from the rear chock 14. When the front wheel 21 of the wagon arrives at the control lever 38 which at this time is in the position shown at 46 in dotted line it engages the upwardly projecting limb 41 of said lever and rocks it over so bringing the chock 14 into the position shown in dotted line at 47, in which position it does not project into the path of the wagon wheels. The chock is finally reset by engagement of the second limb 42 of the control lever 38 by the rear wheel 18 of the wagon. During the resetting of the chock the bar 43 also is brought back to its horizontally extending position. The chock and control lever 38 remain in any position to which they are pushed by reason of the stiff joint at 39. It will be seen that this embodiment possesses an advantage over that previously described, in that no additional means operatively connected to the cradle is necessary to return the control lever to its initial position.

In each embodiment of the invention the distance between the rear chock and its wagon operated control member is preferably less than twice the minimum distance between the wheel of a wagon and the outer face of the adjustment buffer plate. This ensures that however closely a second wagon may be following on to the cradle behind the leaving wagon, the rear chock will always be reset to arrest the second wagon before the front wheels of said wagon arrive at the location of said chock.

The front and rear chocks may be pivotally mounted on either the tippler structure or on the foundations thereof, for example of concrete. Under most conditions it will probably be most convenient to have the chocks supported on the foundations so as to relieve the structure of the tippler from any stresses due to stopping the loaded wagon in motion. Advantages accruing from the invention include the fact that the described method of controlling the position of a loaded wagon on a tippler or like apparatus not only saves time and increases the safety of the operator, but it enables the tippler cradle to be made of a definite minimum length. When the longest wheel base is known, the two chocks can be placed so that they prevent a loaded wagon from moving in either direction on the cradle rails once it has entered the lock constituted by the two chocks. It will readily be seen that although a smaller wagon would have a certain freedom of movement between the chocks, it would nevertheless be prevented from overhanging either of said chocks a sufficient distance to foul the tippler structure.

In the embodiments of the invention described chocks are provided to cooperate with the wheels on one side of the wagon only, but of course the chocks may be duplicated and arranged one pair at each rail of the cradle to cooperate with all four wheels of the wagon.

I claim:

1. In a wagon-tippler the combination with a movable platform provided with parallel running rails to receive and guide each of a succession of wheeled vehicles in turn, the platform supporting the vehicle during a load handling operation, and a fixed structure provided with parallel running rails on both sides of the movable platform so that in one position of the platform the rails on the fixed structure are in alignment with those on the platform to permit the passage of a vehicle on to and off the platform, of an arresting mechanism comprising at least one chock, pivoted to the fixed structure for swinging movement into and away from an operative position, in which the chock cooperates with a front portion of a vehicle on the movable platform, to arrest the vehicle at a predetermined position after running on to the platform, a toggle-link device so arranged between the chock and the fixed structure that when the toggle is extended the chock is supported in the stop position and when the toggle is broken and the links thereof folded, the chock is withdrawn from the said stop position, a toggle-breaking lever pivotally mounted upon the fixed structure for operation by the tippler platform upon movement of the platform at the commencement of a load handling operation, so that when the platform has returned to the position in which the running rails thereon are in alignment with the running rails on the fixed structure, the chock is withdrawn and the vehicle may leave the platform and means for extending the toggle to re-set the chock after the off-going vehicle has left the platform, in order to arrest the following vehicle at a predetermined position on the platform, which means are associated with the fixed structure on the off-going side of the movable platform and are operable in two successive stages by the front and rear wheels in turn.

2. The combination claimed in claim 1 wherein the means to reset the chock of the arresting mechanism in its stop position comprises a double-armed lever operatively connected to the toggle and pivoted to a support upon the fixed structure of the tippler and located at a position spaced away from the chock in the direction of travel of the vehicles, and the two arms of the lever are so arranged as to be rocked over in succession by the front and rear wheels respectively of each vehicle to extend the toggle thus returning the chock to its stop position when the rear wheel engages the second arm.

3. The combination claimed in claim 1, including a withdrawable front stop to prevent each vehicle from running rearwardly off the platform, which stop is arranged to withdraw automatically from the path of each vehicle as it advances on to the platform and to return to its operative position when the vehicle has overrun it.

4. The combination claimed in claim 1, including a withdrawable front stop to prevent each vehicle from running rearwardly off the platform, which stop is arranged to withdraw automatically from the path of each vehicle as it advances on to the platform and to return to its operative position when the vehicle has overrun it, the front stop aforesaid being in the form of a chock to engage a rear wheel of each vehicle, and being yieldingly urged into its operative position by resilient means and arranged to be forced out of said position against the action of the resilient means by the wheels of each vehicle as it runs onto the platform.

FREDERICK GILBERT MITCHELL.

REFERENCES CITED

The following references are of record in the file of this patent:

UNITED STATES PATENTS

| Number | Name | Date |
|---|---|---|
| 1,233,070 | Lepley | July 10, 1917 |
| 1,465,005 | Simpson | Aug. 14, 1923 |
| 1,508,999 | Simpson et al. | Sept. 16, 1924 |
| 1,616,368 | Harmon | Feb. 1, 1927 |